(12) United States Patent
Bialkowski et al.

(10) Patent No.: US 7,688,815 B2
(45) Date of Patent: Mar. 30, 2010

(54) METHOD AND SYSTEM FOR A MULTI-STAGE INTERCONNECT SWITCH

(75) Inventors: Jan Bialkowski, San Jose, CA (US); Wing Cheung, Fremont, CA (US)

(73) Assignee: BarracudaNetworks Inc, Campbell, CA (US)

( * ) Notice: Subject to any disclaimer, the term of this patent is extended or adjusted under 35 U.S.C. 154(b) by 1230 days.

(21) Appl. No.: 10/920,789

(22) Filed: Aug. 17, 2004

(65) Prior Publication Data

US 2005/0041637 A1 Feb. 24, 2005

Related U.S. Application Data (60) Provisional application No. 60/495,987, filed on Aug. 18, 2003.

(51) Int. Cl.
  *H04L 12/50* (2006.01)
(52) U.S. Cl. .................................. 370/388; 370/412
(58) Field of Classification Search ............. 370/351, 370/387, 388, 389, 390, 412, 415, 432, 395.42, 370/395.71, 232, 413, 400; 709/240
See application file for complete search history.

(56) References Cited

U.S. PATENT DOCUMENTS

| | | | | |
|---|---|---|---|---|
| 4,630,260 A * | 12/1986 | Toy et al. | | 370/355 |
| 4,696,000 A * | 9/1987 | Payne, III | | 370/353 |
| 4,845,722 A * | 7/1989 | Kent et al. | | 370/388 |
| 4,984,237 A * | 1/1991 | Franaszek | | 370/388 |
| 5,303,383 A * | 4/1994 | Neches et al. | | 712/43 |
| 5,321,813 A * | 6/1994 | McMillen et al. | | 714/798 |
| 5,680,402 A * | 10/1997 | Olnowich et al. | | 370/498 |
| 6,188,686 B1 * | 2/2001 | Smith | | 370/388 |
| 6,274,758 B1 * | 8/2001 | Paul et al. | | 560/150 |
| 6,307,852 B1 * | 10/2001 | Fisher et al. | | 370/352 |
| 6,430,179 B1 * | 8/2002 | Meyer | | 370/360 |
| 6,535,507 B1 * | 3/2003 | Li et al. | | 370/356 |
| 6,829,237 B2 * | 12/2004 | Carson et al. | | 370/386 |
| 6,901,074 B1 * | 5/2005 | Yamasaki | | 370/400 |
| 7,023,841 B2 * | 4/2006 | Dell et al. | | 370/388 |
| 7,161,906 B2 * | 1/2007 | Dell et al. | | 370/231 |
| 7,382,775 B2 * | 6/2008 | Hesse | | 370/386 |
| 7,464,180 B1 * | 12/2008 | Jacobs et al. | | 709/240 |
| 2002/0010735 A1 * | 1/2002 | McMillen et al. | | 709/201 |
| 2002/0141427 A1 * | 10/2002 | McAlpine | | 370/413 |
| 2008/0212472 A1 * | 9/2008 | Musacchio et al. | | 370/232 |

* cited by examiner

*Primary Examiner*—Steven H Nguyen
*Assistant Examiner*—Vinncelas Louis
(74) *Attorney, Agent, or Firm*—Patentry (57) ABSTRACT

An interconnect switch stores data messages received from one or more source devices and prioritizes the data messages received from each source device based on the order that the data messages were received from the source device. For each available destination device associated with the interconnect switch, the interconnect switch identifies the data messages with the highest priority that are to be routed to the available destination device and selects one of the identified data messages for the available destination device. The interconnect switch then routes the selected data messages to the available destination devices.

36 Claims, 7 Drawing Sheets

METHOD AND SYSTEM FOR A MULTI-STAGE INTERCONNECT SWITCH

CROSS-REFERENCE TO RELATED APPLICATIONS

The present application claims the benefit of priority from U.S. Provisional Patent Application No. 60/495,987, filed on Aug. 18, 2003 and entitled "Method and System for an Interconnect Switch", which is incorporated by reference herein.

BACKGROUND

1. Field of the Invention

The present invention relates generally to interconnection networks in multiprocessing computing systems, and more particularly to a method and system for an interconnect switch that routes data messages within an interconnection network.

2. Background Art

Multiprocessing computing systems often have multiple computing processors that are connected to multiple memory devices through an interconnection network. The interconnection network contains interconnect switches that are interconnected to route data messages between the computing processors and the memory devices during operation of the multiprocessing computing system. A persistent problem with interconnection networks has been maintaining a high throughput of the interconnection network under heavily loaded conditions. Under such conditions, the interconnection network can limit the performance of the multiprocessing computing system if a high throughput is not maintained for the interconnection network.

One type of event that reduces the throughput of an interconnection network occurs when a routing conflict arises between two or more data messages in an interconnect switch. The routing conflict can block additional data messages from entering the interconnect switch while the conflicting data messages are sequentially processed through the interconnect switch. As a result of the routing conflict, the throughput of the interconnect switch and the interconnection network can be reduced.

A number of techniques have been employed to improve the throughput of an interconnection network containing interconnect switches. One prior approach to improving the throughput of an interconnection network is designing the geometry of the interconnection network to provide multiple routing paths for data messages in the interconnection network. Another prior approach to improving the throughput of an interconnection network is designing the interconnect switches to combine certain types of data messages in the interconnect switches to reduce the number of data messages in the interconnection network.

The prior approaches to improving the throughput of interconnection networks have provided limited benefits. Although some of these prior approaches have been successful in improving the throughput of an interconnection network, these approaches have not eliminated the need for further increases in the throughput of an interconnect switch. A need exists for a high throughput interconnect switch in an interconnection network.

SUMMARY OF THE INVENTION

The present invention addresses a need for maximizing throughput of an interconnect switch in an interconnection network. In the present invention, an interconnect switch receives data messages from multiple source devices. The interconnect switch dynamically prioritizes the data messages received from each source device based on the order the data messages are received from the source device. For each available destination device of the interconnect switch, the interconnect switch can select one of the data messages based on a destination identifier in the data message and the priority of the data message. The interconnect switch then routes each of the selected data messages to the available destination device for the selected data message.

A method according to the present invention routes data messages from multiple source devices through an interconnect switch to multiple destination devices. Each of the data messages includes a destination identifier that identifies the final destination of the data message. In the method, the data messages are received by the interconnect switch from the multiple source devices. The data messages received from each source device are dynamically prioritized based on the order the data messages are received from the source device. One or more available destination devices of the interconnect switch are determined, and one of the data messages can then be selected for each available destination device based on the priority and destination identifier of the data message. Each of the selected data messages is routed to the available destination device for the selected data message. The available destination device for each data message can be the final destination of the data message or another interconnect switch.

An interconnect switch according to the present invention routes data messages from multiple source devices to multiple destination devices. Each of the data messages includes a destination identifier that identifies the final destination of the data message. The interconnect switch has an input buffer for each source device. Each input buffer receives data messages from the source device of the input buffer and stores the data messages. A selector in each input buffer dynamically prioritizes the data messages received from the source device of the input buffer based on the order the data messages are received at the input buffer. An arbiter determines one or more available destination devices of the interconnect switch from the multiple destination devices of the interconnect switch. For each available destination device, the arbiter can select one of the data messages based on the priority and destination identifier of the data message. The arbiter routes each selected data message to the available destination device for the selected data message. The available destination device can be the final destination of the data message or another interconnect switch.

An interconnection network according to the present invention routes data messages from multiple source devices to multiple destination devices. Each of the data messages includes a destination identifier that identifies the final destination of the data message. The interconnection network includes multiple interconnect switches, which route the data messages from the source devices to the destination devices. Each of the source devices or destination devices can be another interconnect switch, a computing process or a data device. In the interconnection network, the final destination of each data message can be a computing process or a data device.

A computing system according to the present invention includes computing processes, data devices and a communications network. The communications network includes a data request interconnection network and a data response interconnection network. The data request interconnection network includes interconnect switches that route data messages from the computing processes to the data devices. The data response interconnection network includes interconnect switches that route data messages from the data devices to the computing processes. Each computing process is a source device for one of the interconnect switches in the data request interconnection network and a destination device for one of the interconnect switches in the data response interconnection network. Each data device is a destination device for one of the interconnect switches in the data request interconnection network and a source device for one of the interconnect switches in the data response interconnection network. Additionally, each interconnect switch can be a source device or a destination device of another interconnect switch. In the computing system, the final destination of each data message can be a computing process or a data device.

DETAILED DESCRIPTION OF THE PREFERRED EMBODIMENT

The present invention provides a method and system for an interconnect switch. The interconnect switch receives data messages from multiple source devices and routes the data messages to multiple destination devices. Each of the data messages includes a destination identifier (e.g., memory address) for identifying a final destination of the data message. The interconnect switch stores the data messages received from each source device. Additionally, the interconnect switch dynamically prioritizes each data message received from the source device based on the order the message is received from the source device. The interconnect switch identifies available destination devices of the interconnect switch and selects one of the data messages with the highest priority that is to be routed to each available destination device. The interconnect switch routes each selected data message to the available destination device for the selected data message. The available destination device for each data message can be the final destination of the data message or another interconnect switch.

In one embodiment, multiple interconnect switches are selectively interconnected to each other in an interconnection network for routing date messages from multiple source devices to multiple destination devices. In the interconnection network, the interconnect switches can be grouped into one or more interconnect stages. The interconnect switches in a preceding interconnect stage are selectively connected to the interconnect switches in a succeeding interconnect stage.

In combination, the interconnect switches in the interconnect stages route data messages through the interconnection network to the final destinations of the data messages based on the destination identifiers in the data messages. In the interconnection network, an originator of a data message can be a computing process or a data device. Further, the final destination of a data message can be a computing process or a data device.

In another embodiment, multiple interconnect switches are selectively interconnected into a communications network in a computing system. The communications network includes a data request interconnection network and a data response interconnection network. In addition to the communications network, the computing system includes a computing processor and a collection of data devices, each of which is connected to both the data request interconnection network and the data response interconnect network. The computing processor includes computing processes, each of which can issue data messages (e.g., data requests) to the data request interconnection network. The interconnect switches in the data request interconnection network route the data requests received from the computing processes to the data devices. Each of the data devices that receives a data request from the data request interconnection network can issue a data message (e.g., data response) to the data response interconnection network in response to the data request. The interconnect switches in the data response interconnection network receive the data responses from the data devices and route the data responses to the computing processes. In the computing system, an originator of a data message can be a computing process or a data device. Further, the final destination of a data message can be a computing process or a data device.

Figure 1:
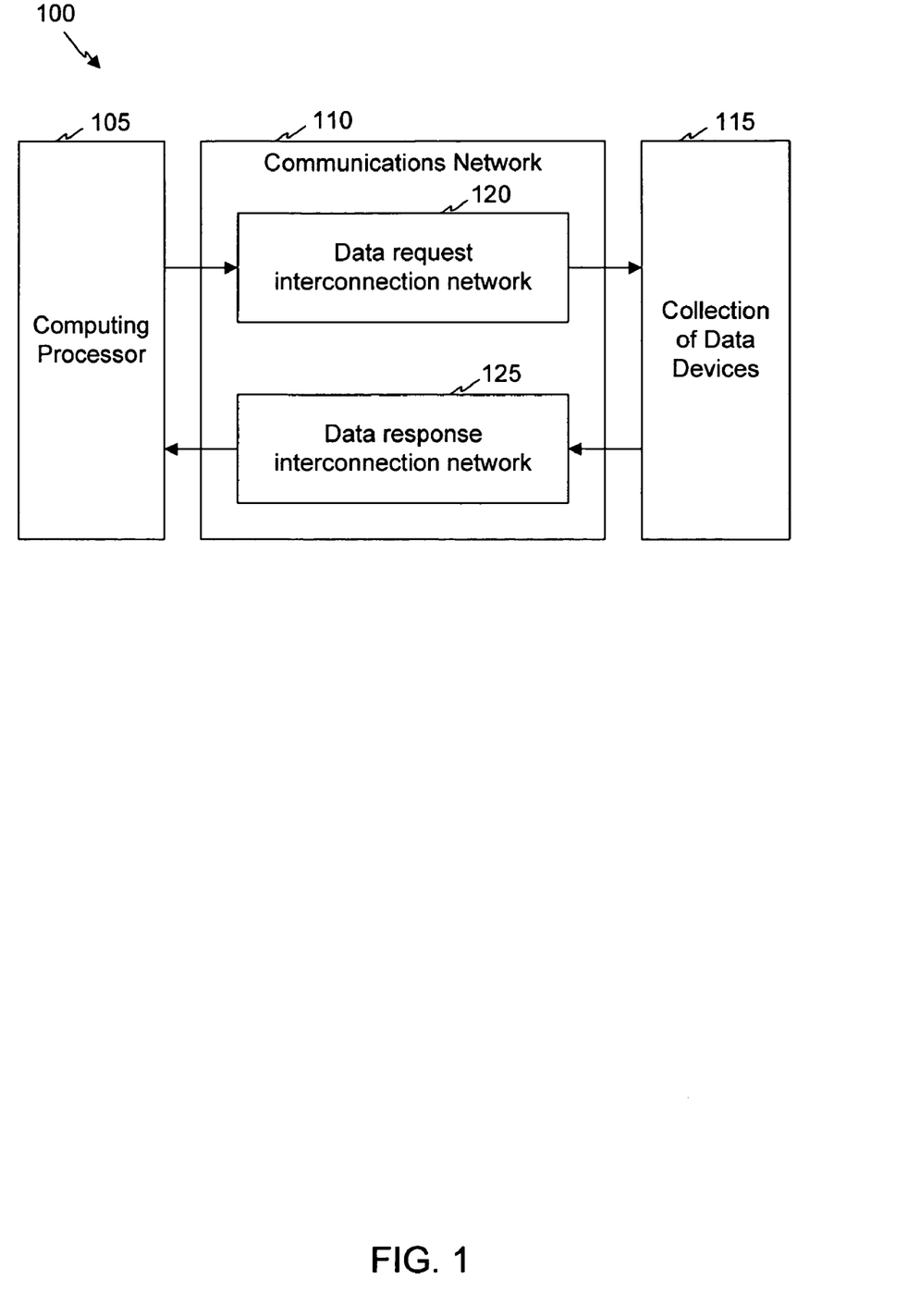
FIG. 1 is a block diagram of a computing system, in accordance with the present invention.

Referring now to FIG. 1, a computing system 100 according to the present invention is shown. The computing system 100 includes a computing processor 105. For example, the computing processor 105 can be a single processor that executes one or more processes or process threads. As another example, the processor 105 can be a single processor that has multiple execution pipelines for executing one or more processes or process threads. As another example, the processor 105 can be a multiprocessor that includes multiple processing units, each of which can execute one or more processes or process threads. As a further example, the processor 105 can be a communications device, such as a cellular telephone, that executes one or more processes or process threads.

The computing system 100 further includes a communications network 110 and a collection of data devices 115. The communications network 110 includes a data request interconnection network 120 and a data response interconnection network 125. The computing processor 105 and the collection of data devices 115 communicate with each other by sending data messages (e.g., data requests and data responses) through the communications network 110, as is described more fully herein.

The computing processor 105 issues data messages (e.g., data requests) to the data request interconnection network 120 for the collection of data devices 115. For example, a data message can be a request to read data from the collection of data devices 115 or a request to store data in the collection of data devices 115. The data request interconnection network 120 routes the data messages received from the computing processor 105 through the data request interconnection network 120 to the collection of data devices 115, as is described more fully herein.

In response to receiving the data messages (e.g., data requests) from the data request interconnection network 120, the collection of data devices 115 processes the data messages. Additionally, the collection of data devices 115 can issue data messages (e.g., data responses) to the data response interconnection network 125 in response to receiving the data messages (e.g., data requests) from the data request interconnection network 120. For example, a data response type data message can include data retrieved from the collection of data devices 115 for a data request type data message. As another example, a data response type data message can include an acknowledgment indicating that data in a data request type data has been stored in the collection of data devices 115. The data response interconnection network 125 routes each data message-received from the collection of data devices 115 through the data response interconnection network 125 to the computing processor 105, as is described more fully herein.

Figure 2:
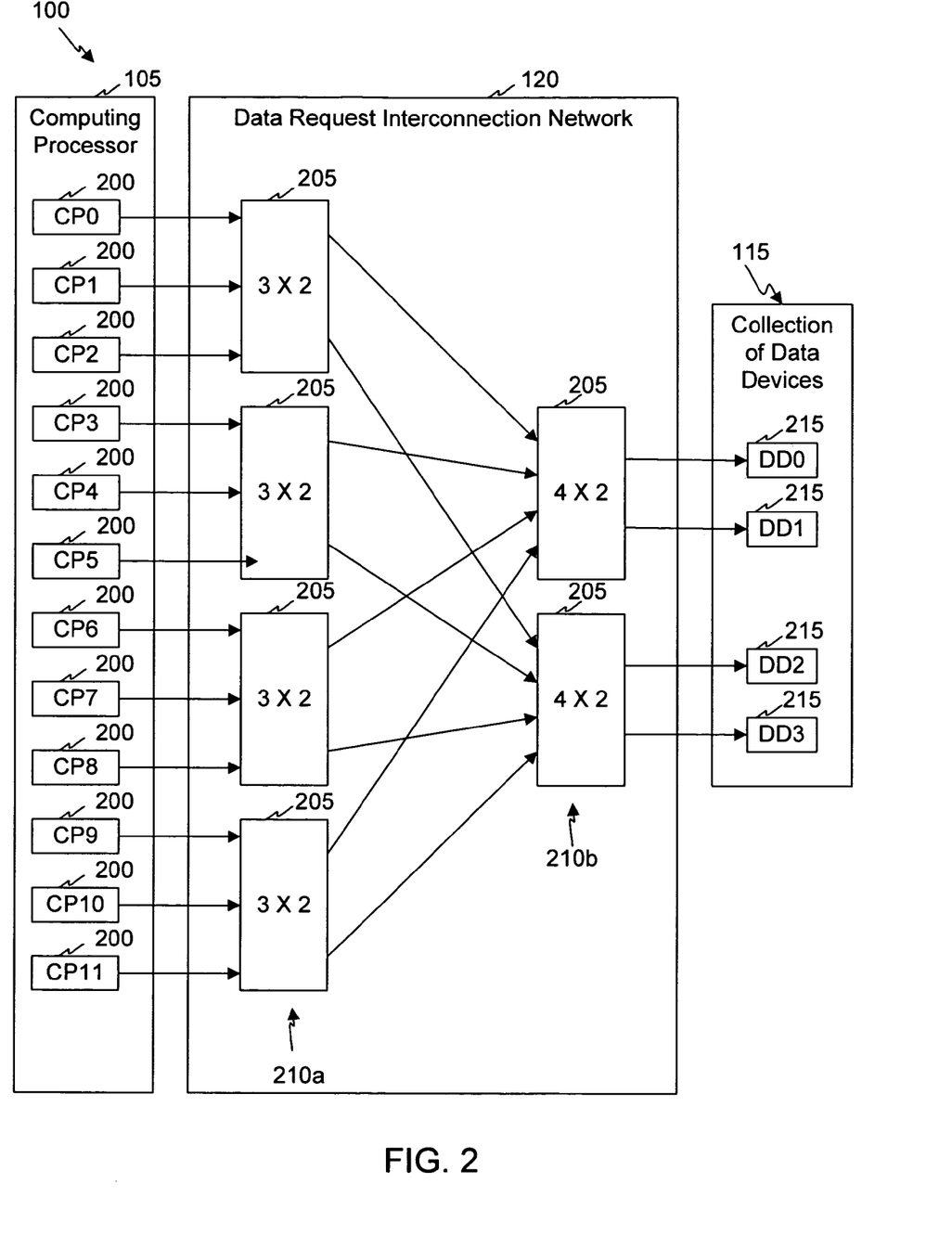
FIG. 2 is a block diagram of a portion of the computing system shown in FIG. 1, in accordance with the present invention.

Referring now to FIG. 2, a portion of the computing system 100 is shown. In this example, the computing processor 105 includes one or more computing processes 200. Each computing process 200 can be a process or a process thread. In one embodiment, each computing process 200 is a process for transferring data using a direct memory access (DMA) device. It is to be understood that the computing processes 200 shown in the figure are exemplary and the present invention is not limited to having any particular number of computing processes 200.

The data request interconnection network 120 includes one or more interconnect switches 205 that route data messages (e.g., data requests) from the computing processor 105 through the data request interconnection network 120 to the collection of data devices 115. In one embodiment, the interconnect switches 205 are selectively interconnected to each other and grouped into one or more interconnect stages 210. Further, in this embodiment, each interconnect switch 205 in the first interconnect stage 210 (e.g., interconnect stage 210a) of the data request interconnection network 120 is connected to the computing processor 105 and communicates with one or more computing processes 200 in the computing processor 105. Each computing process 200 is associated with and communicates with an interconnect switch 205 in the first interconnect stage 210 of the data request interconnection network 120. Additionally, each interconnect switch 205 in a succeeding interconnect stage 210 (e.g., interconnect stage 210b) of the data request interconnection network 120 is selectively connected to and communicates with one or more interconnect switches 205 in a predecessor interconnect stage 210 (e.g., interconnect stage 210a) of the data request interconnection network 120.

The collection of data devices 115 includes one or more data devices 215 for processing data messages. For example, the data device 215 can be a memory device (e.g., a random access memory) or an input-output device (e.g., a disk drive) for storing and retrieving data for a data message. In one embodiment, each interconnect switch 205 in the last interconnect stage 210 (e.g., interconnect stage 210b) of the data request interconnection network 120 is connected to and communicates with one of the data devices 215. In this embodiment, each data device 215 is associated with and communicates with an interconnect switch 205 in the last interconnect stage 210 of the data request interconnection network 120. Further, the final destination of each data message routed through the data request interconnect network 120 is one of the data devices 215. It is to be understood that the interconnect switches 205 and interconnect stages 210 shown in the figure are exemplary and the data request interconnection network 120 is not limited to having any particular number of interconnect switches 205 or interconnect stages 210. It is to be further understood that the data devices 215 shown in the figure are exemplary and the present invention is not limited to having any particular number of data devices 215.

In the computing system 100, a computing process 200 in the computing processor 105 can issue a data message (e.g., data request) to the interconnect switch 205 associated with the computing process 200 in the data request interconnection network 120. The data message includes a destination identifier that identifies the final destination of the data message. In one embodiment, the final destination of the data message is one of the data devices 215 in the collection of data devices 115. In this embodiment, the destination identifier can identify a specific target (e.g., memory address) in the data device 215. Additionally, the data message can include a source identifier that identifies the originator of the data message. In one embodiment, the originator of the data message is a computing process 200 in the computing processor 105. The data message can further include a sequence identifier that identifies the data message. Additionally, the data message can include data to be stored in the final destination of the data message (e.g., a data device 215).

In the data request interconnection network 120, an interconnect switch 205 associated with the computing process 200 receives the data message and routes the data message to a destination device associated with the interconnect switch 205 based on the destination identifier in the data message, as is described more fully herein. The destination device associated with the interconnect switch 205 can be an interconnect switch 205 in a succeeding interconnect stage 210 (e.g., interconnect stage 210b) of the data request interconnection network 120 or a data device 215 in the collection of data devices 115. This process is repeated until the data message is routed to the final destination of the data message (e.g., one of the data devices 215 in the collection of data devices 115).

The data device 215 in the collection of data devices 115 receives the data message (e.g., data request) from the associated interconnect switch 205 in the last interconnect stage 210 (e.g., stage 210b) of data request interconnection network 120 and processes the data message. For example, the destination identifier in the data message can include a memory address and the data device 215 can store data in the data message into the data device 215 at the memory address of the data device 215. Additionally, the data device 215 can issue another data message (e.g., data response) in response to the data message, as is described more fully herein.

Figure 3:
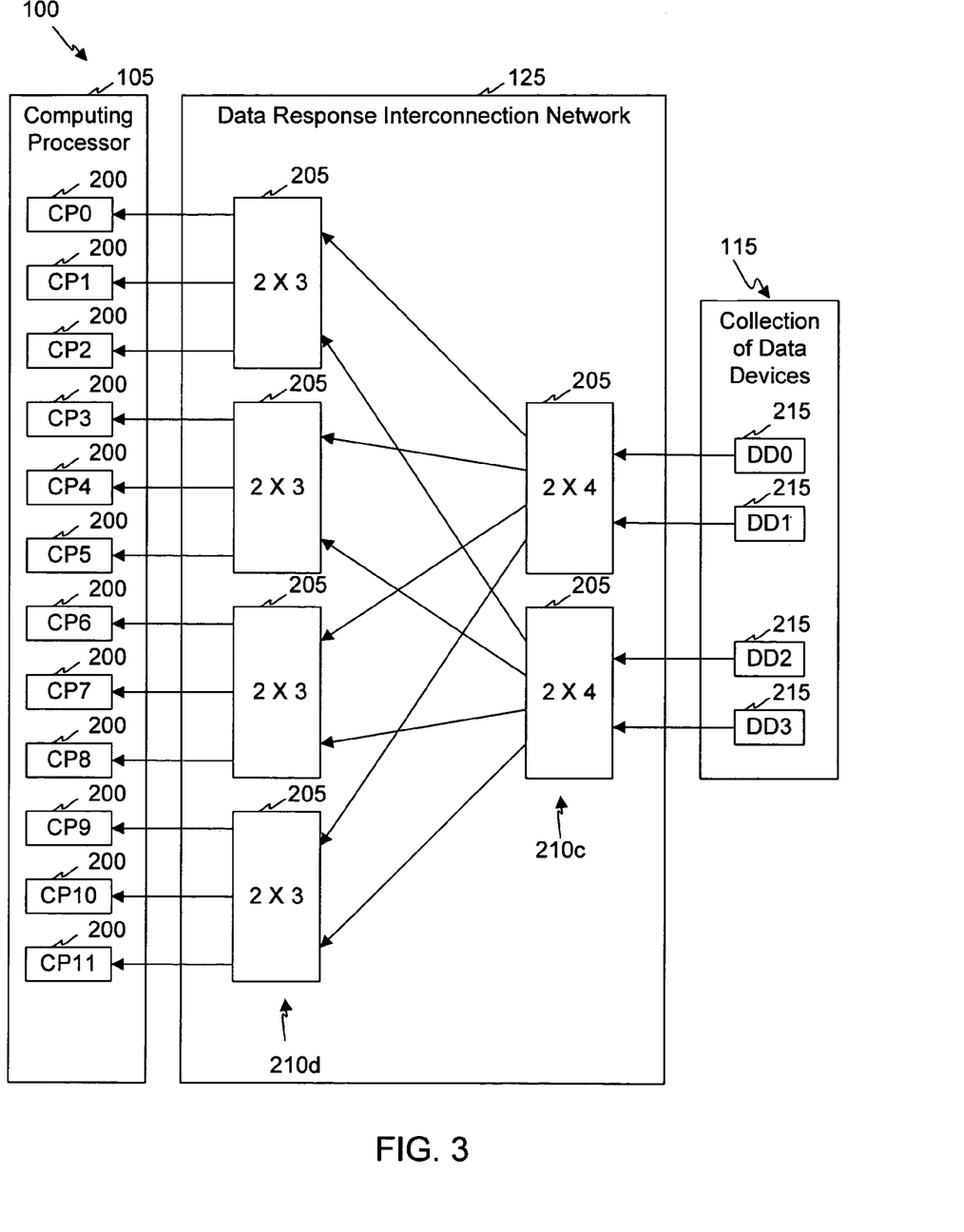
FIG. 3 is a block diagram of a portion of the computing system shown in FIG. 1, in accordance with the present invention.

Referring now to FIG. 3, more details of the computing system 100 are shown. The data response interconnection network 125 includes one or more interconnect switches 205 that are selectively interconnected to each other to route data messages (e.g., data responses) from the collection of data devices 115 through the data response interconnection network 125 to the computing processor 105. In one embodiment, the interconnect switches 205 are grouped into one or more interconnect stages 210. Further, in this embodiment, each interconnect switch 205 in the first interconnect stage 210 (e.g., interconnect stage 210c) of the data response interconnection network 125 is connected to the collection of data devices 115 and communicates with at least one of the data devices 215. Each of the data devices 215 is associated with and communicates with an interconnect switch 205 in the first interconnect stage 210 of the data response interconnection network 125. Additionally, each of the interconnect switches 205 in a succeeding interconnect stage 210 (e.g., interconnect stage 210d) of the data response interconnection network 125 is connected to and communicates with one or more interconnect switches 205 in the preceding interconnect stage 210 (e.g., interconnect stage 210c) of the data response interconnection network 125.

In one embodiment, each interconnect switch 205 in the last interconnect stage 210 (e.g., interconnect stage 210d) of the data-response interconnection network 125 is connected to the computing processor 105. In this embodiment, each computing process 200 in the computing processor 105 is associated with and communicates with an associated interconnect switch 205 in the last interconnect stage 210 of the data response interconnection network 125. Further, in this embodiment, the final destination of each data response routed through the data request response network 125 is one of the computing processes 200. It is to be understood that the interconnect switches 205 and interconnect stages 210 shown in the figure are exemplary and the data response interconnection network 125 is not limited to having any particular number of interconnect switches 205 or interconnect stages 210.

In the collection of data devices 115, a data device 215 can issue a data message (e.g., data response) to the data response interconnection network 125 in response to receiving a data message (e.g., data request) from the data request interconnection network 120. The data message issued by the data device 215 includes a destination identifier that identifies the final destination of the data message. For example, the final destination of the data message issued by the data device 215 can be a computing process 200. Additionally, the data message issued by the data device 215 can include a source identifier that identifies the data device 215 and a sequence identifier that identifies the data message. Further, the data message issued by the data device 215 can include data or an acknowledgment for a computing process 200.

The data device 215 issues the data message (e.g., data response) to the interconnect switch 205 associated with the data device 215 in the first interconnect stage 210 (e.g., interconnect stage 210c) of the data response interconnection network 125. The interconnect switch 205 receives the data message and routes the data message to a destination device associated with the interconnect switch 205 based on the destination identifier in the data message. The destination device associated with the interconnect switch 205 can be an interconnect switch 205 in the succeeding interconnect stage 210 (e.g., interconnect stage 210d) of the data response interconnection network 125 or a computing process 200 in the computing processor 105. This process is repeated until the data message is routed to the final destination of the data message. In this embodiment, the final destination of the data message is one of the computing processes 200 in the computing processor 105.

In one embodiment, the destination identifier in the data response type data message is the source identifier in the data request type data message, and the source identifier in the data response type data message is the destination identifier in the data request type data message. In this embodiment, the final destination of the data request type data message is the originator of the data response type data message and the originator of the data request type data message is the final destination of the data response type data message. In this way, a computing process 200 can issue a data request type data message to a data device 215 and receive a data response type data message from the data device 215 for the data request type data message.

Figure 4:
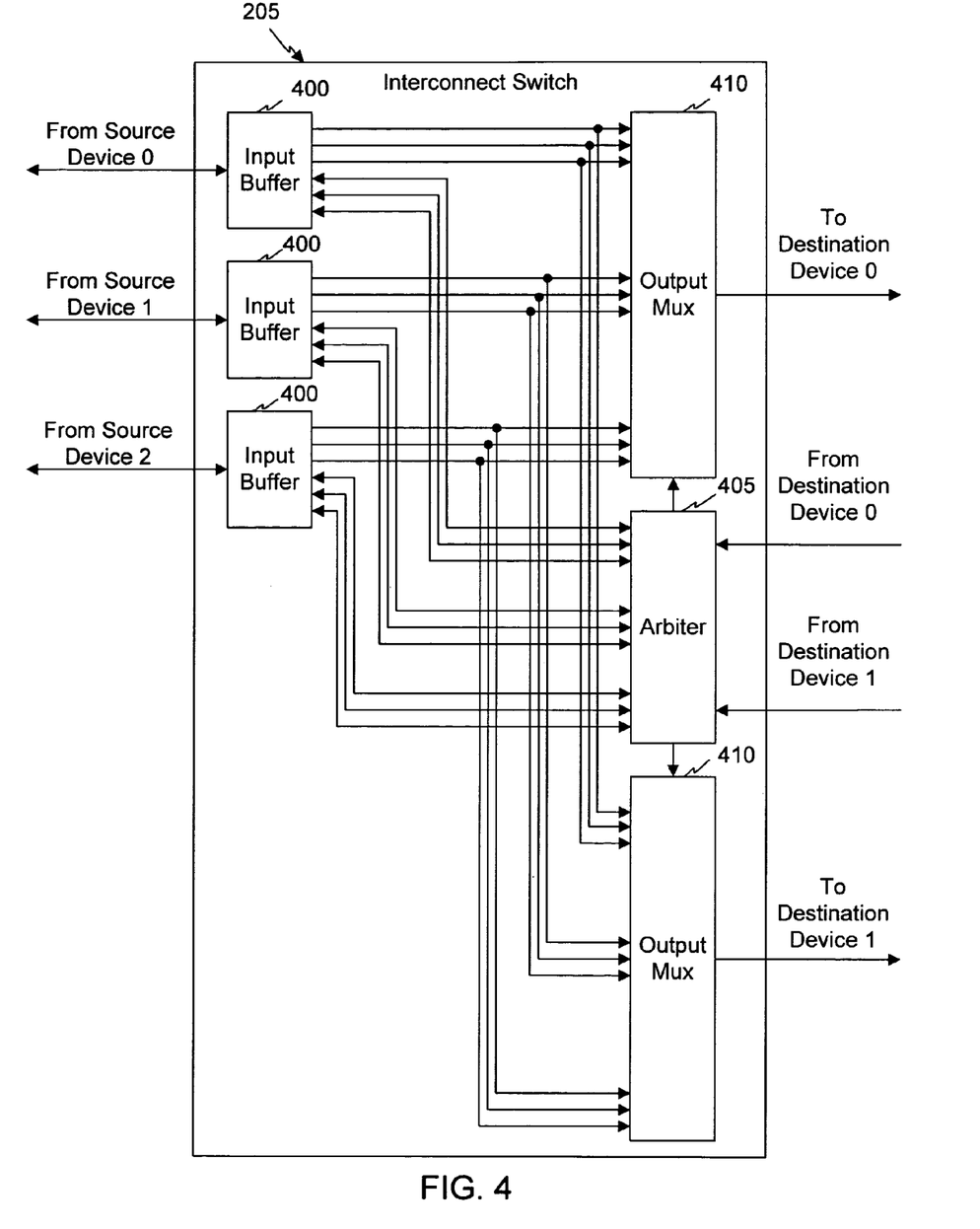
FIG. 4 is a block diagram of an exemplary interconnect switch, in accordance with the present invention.

Referring now to FIG. 4, an exemplary interconnect switch 205 is shown. The interconnect switch 205 includes one or more input buffers 400, an arbiter 405 and output multiplexers 410. Each input buffer 400 communicates with and is associated with one of the source devices associated with the interconnect switch 205. Additionally, each input buffer 400 communicates with the arbiter 405 and the output multiplexers 410 in the interconnect switch 205. Further, the arbiter 405 communicates with the output multiplexers 410 and the destination devices associated with the interconnect switch 205.

Each input buffer 400 is capable of storing one or more data messages. For example, the input buffer can be a set of data registers or a random-access-memory device. The input buffer 400 receives data messages (e.g., data requests or data responses) from a source device associated with the input buffer 400 and provides status information to the source device, as is described more fully herein. In the data request interconnection network 120, the source device associated with each input buffer 400 can be a computing process 200 in the computing processor 105 (e.g., an originator of the data message) or an interconnect switch 205 in a preceding interconnect stage 210 of the data request interconnection network 120. In the data response interconnection network 125, the source device associated with each input buffer 400 can be a data device 215 in the collection of data devices 115 (e.g., an originator of the data message) or an interconnect switch 205 in a preceding interconnect stage 210 of the data response interconnection network 125.

The arbiter 405 controls the routing of data messages through the interconnection switch 205, as is described more fully herein. For example, the arbiter 405 can be a logic circuit, a microcontroller, a microprocessor or a memory device (e.g., read only memory). The arbiter 405 identifies available destination devices of the interconnect switch 205 (i.e., a destination device that can accept a data message from the interconnect switch 205), as is described more fully herein. Additionally, the arbiter 405 identifies data messages in the input buffers 400 that are to be routed to the available destination devices based on the destination identifiers of the data messages.

For each available destination device, the arbiter 405 can select one of the data messages identified for the available destination based on the priority of the data message and a selection algorithm, as is described more fully herein. The arbiter 405 provides a signal to the output multiplexer 410 associated with the available destination device to indicate that the data message selected for the available destination device is to be routed to the available destination device. The output multiplexer 410 receives the signal from the arbiter 405 and passes the selected data message from the input buffer 400 containing the selected data message to the destination device associated with the output multiplexer 410.

In one embodiment, the arbiter 405 can access all of the data messages in the input buffers 400 to identify and select one or more data messages in the input buffers 400 that are to be routed through the interconnect switch 205. For example, the arbiter 405 can select a data message in an input buffer 400 that was stored in the input buffer 400 after the head-of-the-line data message (i.e., the oldest data message in the input buffer) has been stored in the input buffer 400. In this way, blocking of the interconnect switch 205 by the head-of-the-line data message is avoided. In one embodiment, the arbiter 405 simultaneously routes the selected data messages from the input buffers 400 to the appropriate available destination devices for the selected data messages. In this way, the throughput of the interconnect switch 205 is maximized.

After the arbiter 405 has routed the selected data messages through the interconnect switch 205, or concurrently therewith, the arbiter 405 provides a signal to each of the input buffers 400 containing one or more selected data messages to indicate that the selected data messages contained in the input buffer 400 are to be removed from the input buffer 400. Each input buffer 400 containing one or more of the selected data messages receives the signal from the arbiter 405 and removes the selected data messages contained in the input buffer 400, as is described more fully herein. In one embodiment, the input buffers 400 containing the selected data messages receive the signal from the arbiter 405 and simultaneously remove the selected messages from the input buffers 400.

Figure 5:
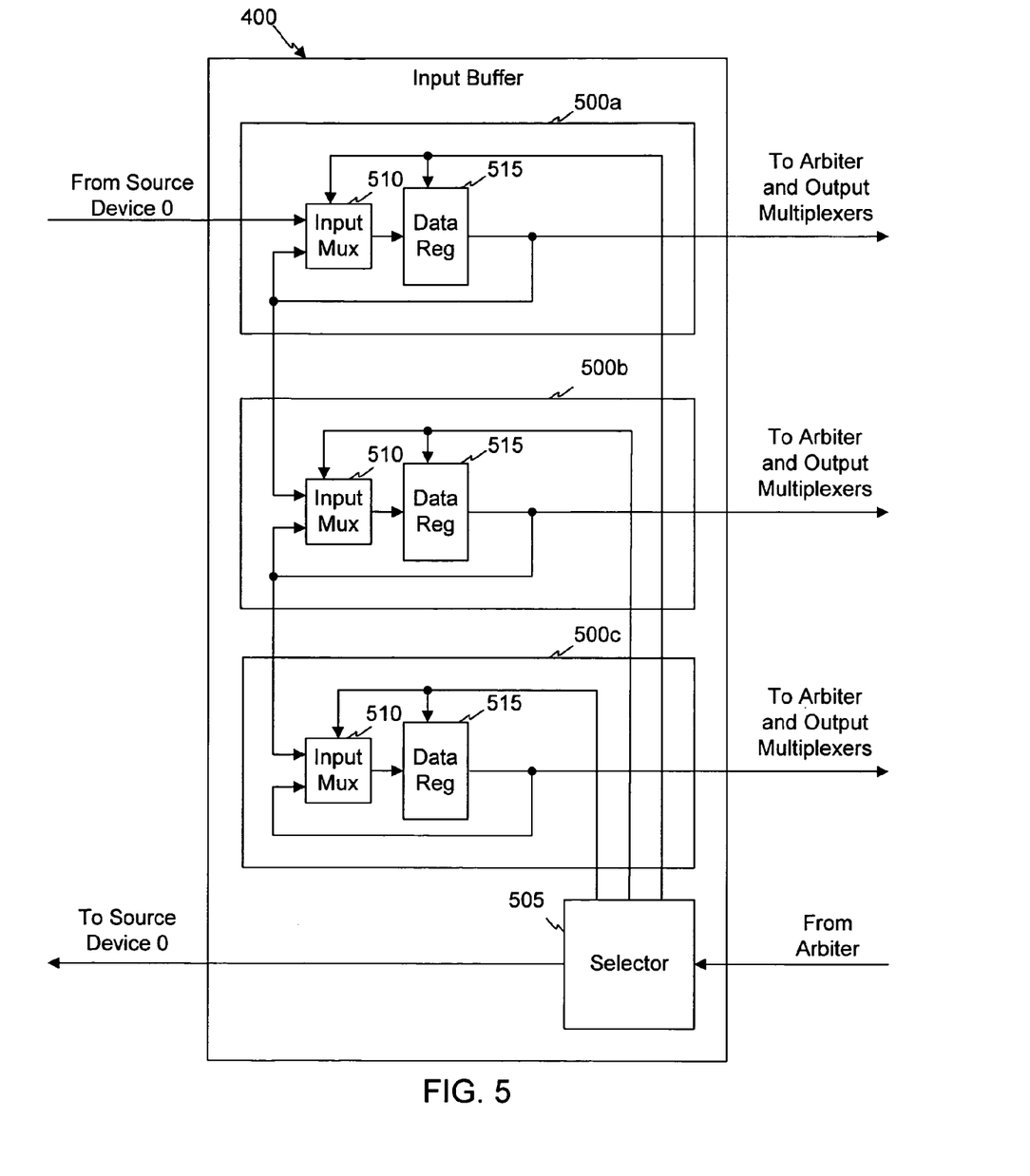
FIG. 5 is a block diagram of an exemplary input buffer for the interconnect switch shown in FIG. 4, in accordance with the present invention.

Referring now to FIG. 5, an exemplary input buffer 400 for an interconnect switch 205 is shown. The input buffer 400 includes multiple buffer stages 500 and a selector 505. Each buffer stage 500 communicates with the selector 505 in the input buffer 400. Additionally, each buffer stage 500 communicates with the arbiter 405 and the output multiplexers 410 of FIG. 4. Further, each preceding buffer stage 500 (e.g., buffer stage 500a) communicates with the succeeding buffer stage 500 (e.g., buffer stage 500b) in the input buffer 400.

Each buffer stage 500 is capable of storing a data message. For example, the buffer stage 500 can be a logic circuit, a data register or a location in a memory device (e.g., an address in a random-access-memory). The selector 505 controls the flow of data messages through the buffer stages 500 and dynamically prioritizes the data messages in the input buffer 400 based on the order the data messages are received by the input buffer 400, as is described more fully herein. For example, the selector 505 can be a logic circuit, a microcontroller or a microprocessor.

The selector 505 stores a data message received from the source device associated with the input buffer 400 into the first buffer stage 500 (e.g., buffer stage 500a) of the input buffer 400 and assigns a lowest priority to the data message. If the arbiter 405 does not select the data message in the first buffer stage 500 for routing through the interconnect switch 205, the selector 505 can advance the data message to the succeeding buffer stage 500 (e.g., buffer stage 500b) of the input buffer 400 to increase the priority of the data message (i.e., dynamically prioritize the data message), as is described more fully herein. Additionally, the selector 505 removes a data message from a buffer stage 500 after the arbiter 405 has selected the data message for routing through the interconnect switch 205, as is described more fully herein. In one embodiment, the selector 505 simultaneously removes the data messages selected by the arbiter 405 from the buffer stages 500 of the input buffer 400, as is described more fully herein.

In one embodiment, each buffer stage 500 in the input buffer 400 has a priority and the priority of a succeeding buffer stage 500 (e.g., buffer stage 500b) has higher priority than the priority of a preceding buffer stage 500 (e.g., buffer stage 500a). Further, the priority of each data message stored in a buffer stage 500 of the input buffer 400 is based on the priority of the buffer stage 500. In this embodiment, the selector 505 controls the flow of the data messages through the buffer stages 500 in the input buffer 400 to dynamically prioritize the data messages stored in the input buffer 400. For example, the selector 505 can pass a data message from a buffer stage 500 (e.g. buffer stage 500a) to a succeeding buffer stage 500 (e.g., buffer stage 500b) to increase the priority of the data message. As a further example, the selector 505 can cause a data message to remain in a buffer stage 500 (i.e., the buffer stage 500 holds the data message) until the arbiter 405 selects the data message for routing to one of the output multiplexers 410.

In one embodiment, each buffer stage 500 in an input buffer 400 includes an input multiplexer 510 and a data register (e.g., flip-flop) 515. The input multiplexer 510 communicates with the data register 515 and a source device associated with the data register 515, as is described more fully herein. The data register 515 communicates with the arbiter 405 and each output multiplexer 410 in the interconnect switch 205. Further, the data register 515 communicates with the input multiplexer 510 of a succeeding buffer stage 500 in the input buffer 400, as is described more fully herein.

In this embodiment, the source device associated with the data register 515 in the first buffer stage 500 (e.g., buffer stage 500a) is the source device associated with the input buffer 400. In the first buffer stage 500, the input multiplexer 510 can pass the contents (e.g., data message) of the source device associated with the input buffer 400 to the data register 515 in the first buffer stage 500, as is described more fully herein. Additionally, the input multiplexer 510 can pass the contents (e.g., data message) of the data register 515 to the data register 515 itself via a feedback path to hold the contents in the buffer stage 500, as is described more fully herein.

For the remaining buffer stages 500 (e.g., buffer stage 500b) in the input buffer 400, the source device associated with the data register 515 is the data register 515 in the preceding buffer stage 500 (e.g., buffer stage 500a). For these remaining buffer stages 500, the input multiplexer 510 in each buffer stage 500 can pass the contents (e.g., data message) of the source device associated with the data register 515 to the data register 515, as is described more fully herein. Additionally, the input multiplexer 510 can pass the contents (e.g., data message) of the data register 515 to the data register 515 itself via a feedback path to hold the contents in the buffer stage 500, as is described more fully herein.

For each buffer stage 500 in the input buffer 400, the selector 505 selects either the source device associated with the data register 515 or the data register 515 itself and provides a signal indicating the selection to the input multiplexer 510. If the signal indicates that the selector 505 selected the source device associated with the data register 515, the input multiplexer 510 passes the contents (e.g., data message) of the source device associated with the data register 515 to the data register 515. If the signal indicates that the selector 505 selected the data register 515, the input multiplexer 510 provides the contents of the data register 515 to the data register 515 itself via a feedback path to maintain the contents in the data register 515 (e.g., hold a data message in the data register 515).

Further, in this embodiment, the arbiter 405 provides a signal to the selector 505 to remove a data message from a data register 515 after the arbiter 405 has selected the data message contained in the data register 415 for routing through the interconnect switch 205. The selector 505 receives the signal from the arbiter 405 and provides a signal to the data register 515 containing the selected data message. The data register 515 containing the selected message receives the signal from the selector 505 and removes the selected data message from the data register 515.

In one embodiment, the arbiter 405 provides a signal to the selector 505 to remove multiple data messages from the data registers 515 in the input buffer 400 after the arbiter 405 has selected the multiple data messages for routing through the interconnect switch 205, or concurrently therewith. In this embodiment, the selector 505 receives the signal from the arbiter 405 and provides a signal to each data register 515 containing one of the selected data messages. The data registers 515 containing the selected data messages receive the signal from the selector 505 and simultaneously remove the selected data messages from the data registers 515.

Additionally, the selector 505 can advance one or more of the remaining data messages in the input buffer 400 to available buffer stages 500 of the input buffer 400, as is described more fully herein. A buffer stage 500 is available if the buffer stage 500 can accept a data message from the source of the buffer stage 500 (e.g. a preceding buffer stage 500). The advancement of a data message to a succeeding buffer stage 500 increases the priority of the data message and can eliminate a bubble (i.e., an empty buffer stage 500 between two buffer stages 500 that each contain a data message) in the input buffer 400. Further, the advancement of one or more data messages through the buffer stages 500 of the input buffer 400 can cause the first buffer stage 500 of the input buffer 400 to become available so that the first buffer stage 500 can receive a data message from the source device associated with the input buffer 400.

Figure 6:
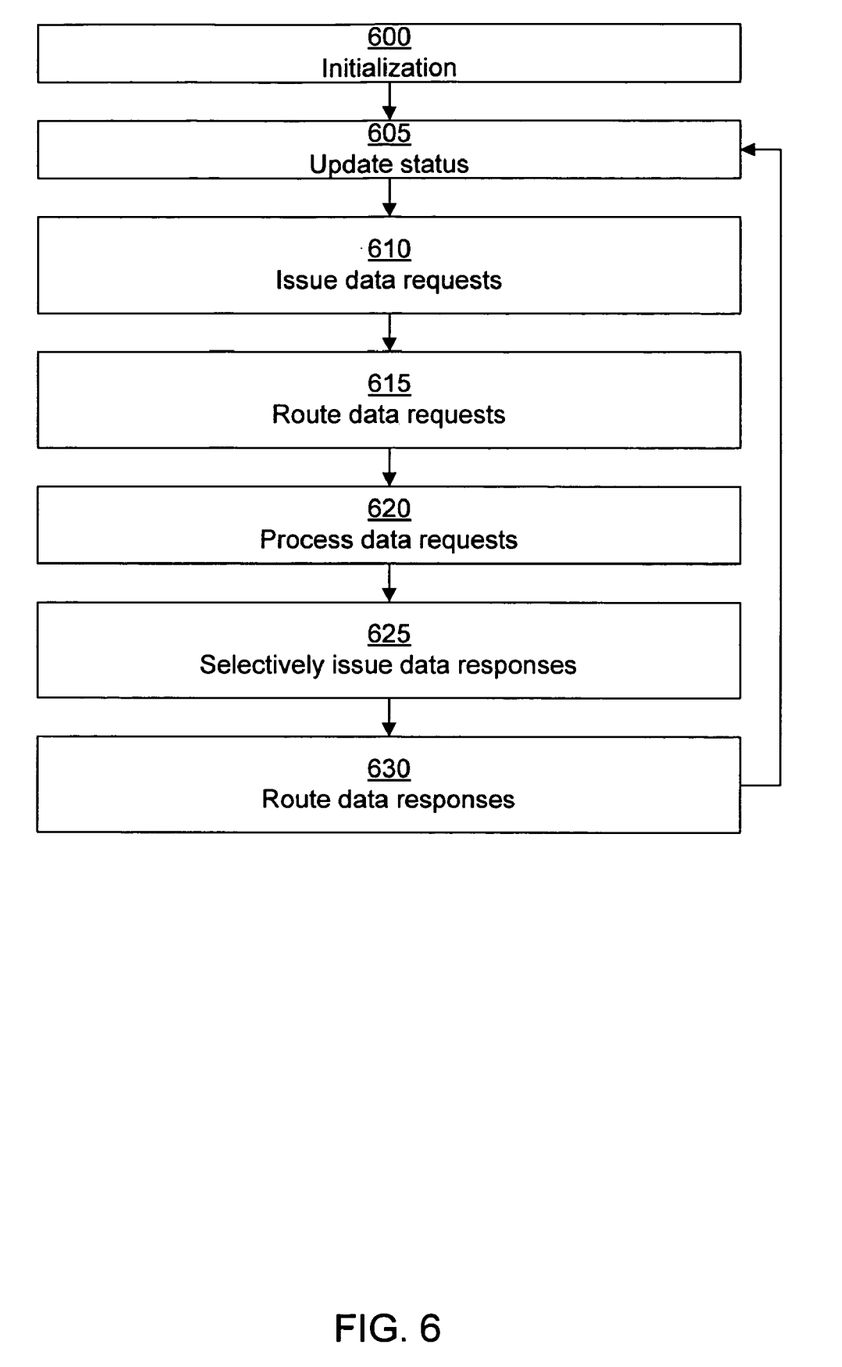
FIG. 6 is a flow chart of a method for routing data messages in the computing system shown in FIG. 1, in accordance with the present invention.

Referring now to FIG. 6, a method for routing data messages in the computing system 100 is shown. In step 600, the data request interconnection network 120 and the data response interconnection network 125 are initialized by clearing the input buffers 400 in each interconnect switch 205. In one embodiment, the arbiter 405 in each interconnect switch 205 sends a signal to each input buffer 400 in the interconnect switch 205 to indicate that the input buffers 400 should be cleared. In this embodiment, each input buffer 400 receives the signal from the arbiter 405 and clears the contents of the input buffer 400 (i.e., the input buffer is made empty).

In step 605, each data device 215 in the collection of data devices 115 updates the status of the data device 215: As part of this process, the data device 215 provides a signal to the interconnect switch 205 associated with the data device 215 in the last stage 210 (e.g., interconnect stage 210b) of the data request interconnection network 120 to indicate whether the data device 215 is available or unavailable. Also, in step 605, each computing process 200 in the computing processor 105 updates the status of the computing process 200. As part of this process, the computing process 200 provides a signal to the interconnect switch 205 associated with the computing process 200 in the last stage 210 (e.g., interconnect stage 210d) of the data response interconnection network 125 to indicate whether the computing process 200 is available or unavailable.

Also in step 605, each interconnect switch 205 in the data request interconnection network 120 updates the status of the interconnect switch 205. For each interconnect switch 205, the arbiter 405 determines if the destination device associated with each output multiplexer 410 in the interconnect switch 205 is available or unavailable, based on a status signal received from the destination device. The destination device associated with each output multiplexer 410 can be a data device 215 or another interconnect switch 205. In one embodiment, the arbiter 405 provides a status signal to the selector 505 in each input buffer 400 of the interconnect switch 205 to indicate whether the destination device associated with the output multiplexer 410 is available or unavailable. If the destination device associated with the output multiplexer 410 is unavailable, the arbiter 405 will not route a data message stored in one of the input buffers 400 to the destination device associated with the output multiplexer 410.

Also in step 605, the selector 505 determines if the input buffer 400 is available or unavailable based on the status signal received from the arbiter 405 and the state of the data messages stored in the buffer stages 500 of the input buffer 400. The input buffer 400 is considered available if the first buffer stage 500 (e.g., buffer stage 500a) of the input buffer 400 can accept a data message from the source device associated with the input buffer 400, as is described more fully herein. The input buffer 400 is considered unavailable if the first buffer stage 500 cannot accept a data message from the source device associated with the input buffer 400. For example, the input buffer 400 is considered unavailable if the first buffer stage 500 of input buffer 400 contains a data message for an unavailable destination device associated with the interconnect switch 205 and the data message in the first input buffer 500 cannot be advanced to the succeeding buffer stage 500 in the input buffer 400 (i.e., the succeeding buffer stage 500 is unavailable). If the input buffer 400 is unavailable, the input buffer 400 provides a status signal to the source device associated with the input buffer 400 indicating that the input buffer 400 is unavailable.

In step 610, each computing process 200 can issue a data message (e.g., data request) to an available destination device in the data request interconnection network 120. In this process, each computing process 200 that has a data message to issue to the data request interconnection network 120 checks the status signal received from the interconnect switch 205 associated with the computing process 200 in the data request interconnection network 120 to determine if the interconnect switch 205 is available. In one embodiment, the status signal is provided to the computing process 200 by the input buffer 400 in the interconnect switch 205 that is to receive the data message from the computing process 200. If the interconnect switch 205 is available, the computing process 200 issues the data message to the interconnect switch 205.

In step 615, each interconnect switch 205 can route one or more data messages (e.g., data requests) through the interconnect switch 205 to available destination devices associated with the interconnect switch 205. In this process, each interconnect switch 205 can receive one or more data messages from the source devices associated with the interconnect switch 205. The interconnect switch 205 prioritizes the data messages received from each source device based on the order the data messages are received from the source device, as is described more fully herein. Additionally, the interconnect switch 205 determines the available destination devices of the interconnect switch 205 based on the status signals received from the destination devices of the interconnect switch 205. The interconnect switch 205 can select one of the data messages for each available destination, based on the destination identifier and priority of the data message, as is described more fully herein. The interconnect switch 205 then simultaneously routes each selected data message contained in the interconnect switch 205 to the available destination device for the selected data message, as is described more fully herein. The available destination for a data message can be the final destination of the data message (e.g., a data device 215) or another interconnect switch 205.

In step 620, each available data device 215 in the collection of data devices 115 can receive a data message (e.g., data request) from the interconnect switch 205 associated with the data device 215 and can process the data request. For example, a data message can be a request to store data contained in the data message into the data device 215 at a location of the data device 215 (e.g., memory address) based on the destination identifier in the data message. As a further example, a data message can be a request to read data from one of the data devices 215 at a location of the data device 215 (e.g., memory address) based on the destination identifier in the data message.

In step 625, each data device 215 that processed a data message (e.g., data request) received from the data request interconnection network 120 determines whether to issue a data message (e.g., data response) in response to the data message. For example, the data device 215 can issue a data response that includes data retrieved from the data device 215 for a data request. As a further example, the data device 215 can issue a data response that includes an acknowledgement for a data request in response to storing data in the data request into the data device 215. If the data device 215 determines to issue a data response in response to the data request, the data device 215 checks the status signal received from the interconnection switch 205 associated with the data device 215 in the data response interconnection network 125 to determine if the interconnect switch 205 is available. If the interconnect switch 205 is available, the data device 215 issues the data response to the interconnect switch 205.

In step 630, the interconnect switches 205 in the data response interconnection network can receive data messages (e.g., data responses) from the data devices 215 and can route the data responses through the data response interconnection network 125 in essentially the same manner as described herein for routing data messages (e.g., data requests) through the data request interconnection network 120. In the last interconnect stage 210 (e.g., interconnect stage 210*d*) of the data response interconnection network 125, however, an interconnect switch 205 routes each data response to one of the computing processes 200 in the computing processor 105, based on the destination identifier in the data response. The method then returns to step 605.

Figure 7:
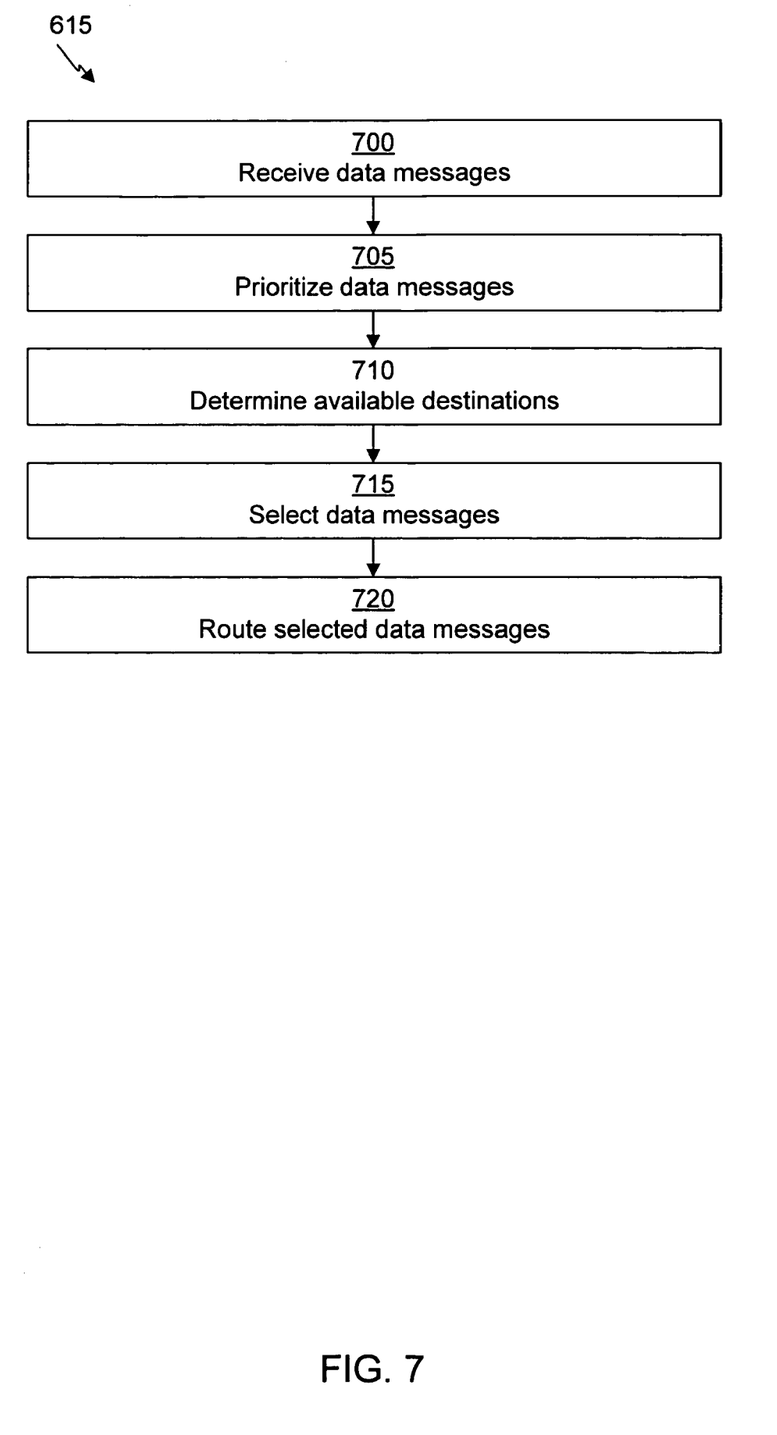
FIG. 7 is a flow chart showing further details of a portion of the method shown in FIG. 6 for routing a data message through an interconnect switch, in accordance with the present invention.

Referring now to FIG. 7, more details of step 615 for routing data messages (e.g., data requests) through an interconnect switch 205 are shown. In step 700, each available input buffer 400 of the interconnect switch 205 can receive a data message from the source device associated with the input buffer 400 (i.e., one of the source devices of the interconnect switch 205). Each input buffer 400 that receives a data message from a source device stores the data message in the first buffer stage 500 (e.g., buffer stage 500*a*) of the input buffer 400.

In step 705, the selector 505 determines the priorities for the data messages stored in the input buffer 400. In this process, the selector 505 determines the priority of each data message stored in the input buffer 400 based on the order the data messages are received from the source device associated with the input buffer 400.

In one embodiment, the selector determines the priority for each data message stored in a buffer stage 500 of the input buffer 400 based on the priority of the buffer stage 500 containing the data message. In this embodiment, each succeeding buffer stage 500 has a higher priority than the preceding buffer stage 500. Further, in this embodiment, the selector 505 in each input buffer 400 controls the flow of the data messages stored in the input buffer 400 through the buffer stages 505 of the input buffer 500 to prioritize the data messages, as is described more fully herein.

In step 710, the arbiter 405 determines available destination devices associated with the interconnect switch 205 based on the status signals received from the destination devices of the interconnect switch 205, as is described more fully herein. An available destination device is a destination device associated with the interconnect switch 205 that can accept a data message provided by the interconnect switch 205.

In step 715, the arbiter 405 can select one of the data messages stored in the input buffers 400 of the interconnect switch 205 for each available destination device of the interconnect switch 205. In one embodiment, the arbiter 405 can identify the data message with the highest priority in each input buffer that is to be routed to each available destination device. The arbiter 405 then chooses one of the data messages with the highest priority that is to be routed to the available destination. If the arbiter 405 has identified more than one data message stored in the input buffers 400 that has the highest priority, the arbiter 405 selects one of these data messages that has the highest priority based on a selection algorithm. For example, the selection algorithm can be a round robin selection algorithm.

In step 720, the arbiter 405 routes each selected data message through the interconnect switch 205. In this process, the arbiter 405 provides a signal to each output multiplexer 410 associated with an available destination device for a selected data message to indicate that the selected-data message is to be routed to the available destination device. The output multiplexer 410 receives the signal from the arbiter 405 and passes the selected data message from the input buffer 400 containing the selected data message to the available destination device for the selected data message. In one embodiment, the output multiplexers 410 simultaneously pass the selected data messages to the appropriate available destination devices for the selected data messages.

Also in step 720, the arbiter 405 sends a signal to the selector 505 of each input buffer 400 containing one or more of the selected data messages to indicate that the selected data messages contained in the input buffer 400 are to be removed from the input buffer 400. The selector 505 in the input buffer 400 receives the signal from the arbiter 405 and removes the selected data messages contained in the buffer stages 500 of the input buffer 400, as is described more fully herein. In one embodiment, the selectors 505 in the input buffers 400 receive the signal from the arbiter 405 and simultaneously remove the selected data messages from the buffer stages 500 in the input buffers 400.

Also in step 720, the selector 505 can advance one or more of the remaining data messages in the input buffer 400 through the buffer stages 500 of the input buffer 400, as is described more fully herein. For example, the selector 505 can advance a data message stored in a preceding buffer stage 500 (e.g., buffer stage 500*a*) to an available succeeding buffer stage 500 (e.g., buffer stage 500*b*). The advancement of a data message from a preceding buffer stage 500 to a succeeding buffer stage 500 increases the priority of the data message that has not been selected by the arbiter 405 for routing through the interconnect switch 205. Additionally, advancement of the data message from the preceding buffer stage 500 to the succeeding buffer stage 500 can eliminate bubbles (i.e., an empty buffer stage 500 between two buffer stages 500 each containing a data message) in the input buffer 400.

It is to be appreciated that the steps described herein for routing a data message (e.g., data request) through an interconnect switch 205 for step 615 are essentially the same steps for routing a data message (e.g., data response) through an interconnect switch for step 630.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for routing data messages from a plurality of source devices to a plurality of destination devices through a multi-stage interconnect switch, wherein the multi-stage interconnect switch comprises an input buffer comprising multiple buffer stages, each buffer stage in the input buffer imputative of a priority of the data message contained by it, the imputative priority of a succeeding buffer stage in the input buffer being higher than the imputative priority of a preceding buffer stage, the method comprising:

receiving multiple data messages from a plurality of source devices, each data message including a destination identifier that identifies the final destination of the data message;

initially imputing the priority for each of the data messages received from each source device based on the order received from the source device by storing said data message into one of said buffer stages;

determining an available destination device;

selecting one data message for the available destination device based on the priority initially set based on the order of reception and the destination identifier that identifies the final destination of the data message; and routing the selected data message to the available destination device;

determining an other available destination device;

selecting at least one other data message for the other available destination device based on the priority of the other data message and the destination identifier that identifies the final destination of the other data message;

routing the at least one selected other data message to the other available destination device; and reprioritizing a first data message by determining an available buffer stage in the input buffer;

identifying the first data message in the preceding buffer stage of the available buffer stage; and advancing the first data message from the preceding buffer stage of the available buffer stage to the available buffer stage to increase the priority of the first data message, whereby advancing the first data message eliminates an empty buffer stage in the input buffer.

2. A method as recited in claim 1, wherein routing the selected data message and routing the selected other data message occur essentially simultaneously.

3. A method as recited in claim 1, wherein receiving one of the multiple data messages occurs before receiving one other of the data messages and routing the selected data message occurs after routing the selected other data message.

4. A method as recited in claim 1, wherein the plurality of source devices is an integer which is not equal to the plurality of available destination devices.

5. A method as recited in claim 1, wherein selecting one data message further comprises:

identifying at least one data message for the available destination device, wherein the destination identifier that identifies the final destination of each identified data message identifies the available destination device; and choosing one of the identified data messages having a highest priority.

6. A method as recited in claim 5, wherein each identified data message has the highest priority.

7. A multi-stage interconnect switch for routing data messages from multiple source devices to multiple destination devices, each data message including a destination identifier that identifies the final destination of the data message, the interconnect switch comprising:

an input buffer for each source device, each input buffer configured to store multiple data messages received from the source device, said input buffer comprises multiple buffer stages, each buffer stage in the input buffer imputative of a priority of the message contained by it, said imputative priority of a succeeding buffer stage in the input buffer being higher than said imputative priority of a preceding buffer stage in the input buffer, wherein the priority of each data message is based on the imputative priority of the buffer stage containing the data message;

a selector configured to prioritize the data messages within each input buffer based on the order received by the input buffer, the selector further configured to reprioritize by: determining an available buffer stage in the input buffer; identifying a first data message in the preceding buffer stage of the available buffer stage; and advancing the first data message from the preceding buffer stage of the available buffer stage to the available buffer stage to increase the priority of the first data message, whereby advancing the first data message eliminates an empty buffer stage in the input buffer; and an arbiter configured to determine an available destination device, select one data message for the available destination device based on the priority determined by said selector and the destination identifier that identifies the final destination of the data message, and route the selected data message to the available destination device, wherein the arbiter is further configured to determine an other available destination device, select one other data message for the other available destination device based on the priority and the destination identifier that identifies the final destination of the other data message, and route the selected other data message to the other available destination device.

8. A multi-stage interconnect switch as recited in claim 7, wherein the arbiter is further configured to essentially simultaneously route the selected data message and the selected other data message and if the arbiter has identified more than one data message stored in the input buffers that have the highest priority for a certain destination, the arbiter selects one of said data messages based on a round robin selection algorithm and wherein each buffer stage further comprises a data register and an input multiplexer coupled to the selector whereby the selector selects either the source device associated with the data register or the data register itself providing a feedback path to hold a data message in the data register.

9. An interconnect switch as recited in claim 7, wherein the arbiter is further configured to route the selected data message and the selected other data message in an order different from the order in which the selected data message and the selected other data message are received; and the arbiter is adapted to select a data message in an input buffer that was stored into the input buffer after the head-of-the-line data message has been stored into the input buffer whereby blocking of the multi-stage interconnect switch by the head-of-the-line data message is avoided and problems associated with First In First Out memories are prevented.

10. A multi-stage interconnect switch as recited in claim 7, wherein the arbiter is further configured to identify a plurality of data messages for the available destination device based on the destination identifier that identifies the final destination of each data message in the plurality of data messages, and the selected data message is one of the identified data messages.

11. A multi-stage interconnect switch as recited in claim 7, wherein at least one source device is an other interconnect switch.

12. An interconnection network comprising:
a plurality of multi-stage interconnect switches configured to route data messages from a first plurality of source devices to a second plurality of destination devices wherein the first plurality is an integer not equal to the second plurality, each data message including a destination identifier that identifies the final destination of the data message, each multi-stage interconnect switch comprising:
an input buffer for each source device of the interconnect switch, each input buffer comprising multiple buffer stages and a selector, configured to store multiple data messages received from the source device of the multi-stage interconnect switch;
a selector configured to dynamically prioritize the data messages in each input buffer based on the order received by the input buffer by advancing the data message from a preceding buffer stage to a succeeding buffer stage to increase priority of the data message; and
an arbiter configured to determine an available destination device of the interconnect switch, select one data message stored in one of the input buffers for the available destination device based on the priority and the destination identifier that identifies the final destination of the data message, and route the selected data message to the available destination device, wherein the arbiter of each interconnect switch is further configured to determine an other available destination device of the interconnect switch, select one other data message stored in one of the input buffers of the interconnect switch for the other available destination device based on the priority and the destination identifier that identifies the final destination of the other data message, and route the selected other data message to the other available destination device.

13. An interconnection network as recited in claim 12, wherein the arbiter in each multi-stage interconnect switch is further configured to essentially simultaneously route the selected data message of the multi-stage interconnect switch to the available destination device of the multi-stage interconnect switch and route the selected other data message of the multi-stage interconnect switch to the other available destination device of the multi-stage interconnect switch; and the arbiter of each multi-stage interconnect switch is configured if the arbiter has identified more than one data message stored in the input buffers that has the highest priority for a certain destination, the arbiter selects one of the data messages that has the highest priority based on a round robin selection algorithm.

14. An interconnection network as recited in claim 12, wherein at least one of the source devices of at least one of the interconnect switches is an other interconnect switch.

15. An interconnection network as recited in claim 12, wherein at least one of the destination devices of at least one of the interconnect switches is an other interconnect switch.

16. An interconnection network as recited in claim 12, wherein the interconnect switches are grouped into multiple interconnect stages, the interconnect switches in a preceding interconnect stage selectively interconnected to the interconnect switches in a succeeding interconnect stage.

17. An interconnection network as recited in claim 16, wherein each interconnect switch in the preceding interconnect stage is one of the source devices for at least one interconnect switch in the succeeding interconnect stage.

18. An interconnection network as recited in claim 16, wherein each interconnect switch in the succeeding interconnect stage is one of the destination devices for at least one interconnect switch in the preceding interconnect stage.

19. An interconnection network as recited in claim 12, wherein the destination identifier that identifies the final destination of each data message identifies a memory address in one of the destination devices.

20. An interconnection network as recited in claim 12, wherein at least one of the source devices is an originator of at least one of the data messages.

21. An interconnection network as recited in claim 20, wherein the originator is a computing process.

22. An interconnection network as recited in claim 20, wherein the originator is a data device.

23. An interconnection network as recited in claim 12, wherein at least one of the destination devices is a final destination of at least one of the data messages.

24. An interconnection network as recited in claim 23, wherein the final destination is a data device.

25. An interconnection network as recited in claim 23, wherein the final destination is a computing process.

26. A computing system comprising:
a first plurality of computing processes;
a second plurality of data devices; wherein the first plurality is an integer not equal in magnitude to the second plurality, and
a communications network comprising a data request interconnection network and a data response interconnection network, wherein:
the data request interconnection network comprises a first plurality of multi-stage interconnect switches and the data response interconnection network comprises a second plurality of multi-stage interconnect switches,
each computing process comprises a source device of one of the multi-stage interconnect switches in the data request interconnection network,
each data device comprises a destination device of one of the multi-stage interconnect switches in the data request interconnection network,
each data device comprises a source device of one of the multi-stage interconnect switches in the data response interconnection network,
each computing process comprises a destination device of one of the multi-stage interconnect switches in the data response interconnection network, and
each multi-stage interconnect switch comprises:
an input buffer for each source device of the interconnect switch, each input buffer comprising multiple buffer stages and a selector configured to store multiple data messages received from the source device of the multi-stage interconnect switch into the first buffer stage whereby each data message stored into the first buffer stage is assigned the lowest priority, wherein the multiple buffer stages comprise at least one preceding buffer stage coupled to at least one succeeding buffer stage;
a selector, configured to dynamically prioritize the data messages in each input buffer based on the order received by the input buffer, coupled to at least one of said preceding buffer stages and to at least one of said succeeding buffer stages whereby the selector can advance the data message to the succeeding buffer stage to increase the priority of the data message; and
an arbiter, configured to determine an available destination device of the interconnect switch, select one data message comprising a destination identifier that identifies the final destination of the data message stored in one of the input buffers for the available destination device based on the priority and said destination identifier of the data message, and route the selected data message to the available destination device, wherein the arbiter of each multi-stage interconnect switch is further configured to determine an other available destination device of the interconnect switch, select one other data message stored in one of the input buffers of the interconnect switch for the other available destination device based on the priority and the destination identifier of the other data message, and route the selected other data message to the other available destination device;

wherein the interconnect switches in the data request interconnection network are grouped into multiple interconnect stages, the interconnect switches in a preceding interconnect stage of the data request interconnection network selectively interconnected to the interconnect switches in a succeeding interconnect stage of the data request interconnection network, and the interconnect switches in the data response interconnection network are grouped into multiple interconnect stages, the interconnect switches in a preceding interconnect stage of the data response interconnection network selectively interconnected to the interconnect switches in a succeeding interconnect stage of the data response interconnection network.

27. A computing system as recited in claim 26, wherein the arbiter in each multi-stage interconnect switch is further configured to essentially simultaneously route the selected data message of the interconnect switch to the available destination device of the interconnect switch and route the selected other data message of the interconnect switch to the other available destination device of the interconnect switch and wherein the arbiter of each multi-stage interconnect switch is configured if the arbiter has identified more than one data message stored in the input buffers that has the highest priority for a certain destination, the arbiter selects one of the data messages that has the highest priority based on a round robin selection algorithm.

28. A computing system as recited in claim 26, wherein the destination identifier that identifies the final destination of each data message identifies one of the destination devices.

29. A computing system as recited in claim 26, wherein at least one of the source devices of at least one of the interconnect switches is an other interconnect switch.

30. A computing system as recited in claim 26, wherein at least one of the destination devices of at least one of the interconnect switches is an other interconnect switch.

31. A computing system as recited in claim 26, wherein at least one of the source devices is an originator of at least one of the data messages.

32. A computing system as recited in claim 31, wherein the originator is one of the computing processes.

33. A computing system as recited in claim 31, wherein the originator is one of the data devices.

34. A computing system as recited in claim 26, wherein at least one of the destination devices is a final destination of at least one of the data messages.

35. A computing system as recited in claim 34, wherein the final destination is a location in memory and the destination identifier is a memory address.

36. A computing system as recited in claim 34, wherein the final destination is one of the computing processes.

* * * * *